United States Patent
Li et al.

(12)

(10) Patent No.: US 11,090,641 B2
(45) Date of Patent: Aug. 17, 2021

(54) $COFE_2O_4$-WTRS COMPOSITE MAGNETIC CATALYST, PREPARATION METHOD AND APPLICATION THEREOF

(71) Applicant: Beijing Normal University, Beijing (CN)

(72) Inventors: Xiaowan Li, Beijing (CN); Xitao Liu, Beijing (CN); Chunye Lin, Beijing (CN); Huijuan Zhang, Beijing (CN); Zhou Zhou, Beijing (CN); Guoxuan Fan, Beijing (CN); Mengchang He, Beijing (CN); Wei Ouyang, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 236 days.

(21) Appl. No.: 16/257,092

(22) Filed: Jan. 25, 2019

(65) Prior Publication Data

US 2020/0238268 A1 Jul. 30, 2020

(51) Int. Cl.
*B01J 35/00* (2006.01)
*B01J 23/745* (2006.01)
(Continued)

(52) U.S. Cl.
CPC ......... *B01J 35/0033* (2013.01); *B01J 23/745* (2013.01); *B01J 23/75* (2013.01);
(Continued)

(58) Field of Classification Search
CPC ...... B01J 35/0033; B01J 23/745; B01J 23/75; B01J 23/005; B01J 37/0036; B01J 37/035;
(Continued)

(56) References Cited

U.S. PATENT DOCUMENTS

2009/0194733 A1\* 8/2009 Schulz ............... C01G 49/0072
252/62.56

\* cited by examiner

*Primary Examiner* — Anita Nassiri-Motlagh
(74) *Attorney, Agent, or Firm* — Bayramoglu Law Offices LLC

(57) ABSTRACT

The present invention discloses a $CoFe_2O_4$-WTRs composite magnetic catalyst for efficiently degrading atrazine by activating peroxymonosulfate, preparation method and application thereof. The $CoFe_2O_4$-WTRs composite magnetic catalyst is prepared by three steps: the first step is acid-leaching of WTRs, using the WTRs as iron source to provide the iron ions required for the synthesis of $CoFe_2O_4$; the second step is preparing of a precursor, synthesizing $CoFe_2O_4$ by chemical co-precipitation method and uniformly loading the prepared $CoFe_2O_4$ on the WTRs; and the third step is calcining the precursor to synthesize the $CoFe_2O_4$-WTRs composite magnetic catalyst. The catalytic performance of the $CoFe_2O_4$-WTRs composite magnetic catalyst prepared by the present invention is evaluated using PMS as an oxidant and atrazine as a target pollutant. The $CoFe_2O_4$-WTRs can efficiently remove atrazine from the actual water, exhibiting good potential for practical application.

9 Claims, 9 Drawing Sheets

(51) Int. Cl.
*B01J 23/75* (2006.01)
*B01J 37/03* (2006.01)
*B01J 37/00* (2006.01)
*B01J 37/08* (2006.01)
*C02F 1/72* (2006.01)
B01J 23/00 (2006.01)
C02F 101/38 (2006.01)

(52) U.S. Cl.
CPC ......... *B01J 37/0036* (2013.01); *B01J 37/035* (2013.01); *B01J 37/08* (2013.01); *C02F 1/725* (2013.01); B01J 23/005 (2013.01); C02F 2101/38 (2013.01); C02F 2201/002 (2013.01); C02F 2209/06 (2013.01); C02F 2209/44 (2013.01)

(58) Field of Classification Search
CPC ....... B01J 37/08; C02F 1/725; C02F 2101/38; C02F 2201/002; C02F 2209/06; C02F 2209/44
USPC ..................................................... 423/240 S
See application file for complete search history.

$CoFe_2O_4$-WTRS COMPOSITE MAGNETIC CATALYST, PREPARATION METHOD AND APPLICATION THEREOF

TECHNICAL FIELD

The present invention relates to a $CoFe_2O_4$-WTRs composite magnetic catalyst, and particularly to a composite magnetic catalyst for efficiently degrading atrazine by activating peroxymonosulfate, a preparation method and an application thereof, belonging to the field of composite materials.

BACKGROUND

Persulfate-based advanced oxidation technology, with the advantages of strong oxidizing ability, high degradation efficiency and less secondary pollution, is an emerging pollutant treatment technology and has received extensive attention in the field of environmental remediation. Generally, persulfate can be activated by external energy or catalyst to generate highly reactive free radicals and consequently degrade or even mineralize organic contaminants. Among the various catalysts, spinel cobalt ferrite ($CoFe_2O_4$) is recognized as a high-efficient and promising persulfate activator due to its high catalytic activity, low cobalt leaching and easy magnetic separation. However, for the preparation of $CoFe_2O_4$ by the currently used sol-gel method, chemical co-precipitation method and hydrothermal method, massive ferric salts are required to provide iron ions for the synthesis of $CoFe_2O_4$, resulting in resource consumption and increased economic cost. In addition, for the catalytic performance of $CoFe_2O_4$, the aggregation effect caused by magnetic interaction will significantly reduce the catalytic activity of $CoFe_2O_4$, thus affecting its ability to activate persulfate and degrade target pollutants. Loading $CoFe_2O_4$ on diverse substrates to improve the dispersion of $CoFe_2O_4$ is an effective way to inhibit the magnetic aggregation and ensure the catalytic reactivity of $CoFe_2O_4$. Although graphene, graphene oxide, carbon nanotube and other carriers can effectively disperse $CoFe_2O_4$, the expensive price thereof hinders their wide application. Based on the above two points, it is of practical significance to simultaneously seek natural or abandoned iron-containing materials as iron sources and catalyst carriers with abundant sources and low prices in reducing energy consumption and economic cost.

Drinking water treatment residuals (WTRs), iron-rich and non-hazardous byproduct generated from water treatment plants, has the potential of being iron source after acid leaching to provide the iron ions for the synthesis of $CoFe_2O_4$. In addition, other solid components of WTRs might serve as the support of synthetic $CoFe_2O_4$ and subsequently promote its even distribution during the preparation process. WTRs offers dual functions of iron source and catalyst carrier, which is the process of waste resource utilization, i.e., not only avoids the supplement of iron-containing reagents and reduces the economic cost of synthesizing $CoFe_2O_4$, but also promotes the uniform distribution of $CoFe_2O_4$ and suppresses the decrease of catalytic activity caused by magnetic aggregation effect. Activating peroxymonosulfate by the prepared $CoFe_2O_4$-WTRs to degrade atrazine simultaneously solves the problem of treatment and disposal of WTRs and provides purification technology and remediation path for atrazine polluted water.

SUMMARY

The objective of the present invention is to provide a spinel cobalt ferrite-drinking water treatment residuals composite magnetic catalyst (abbreviated as $CoFe_2O_4$-WTRs).

A $CoFe_2O_4$-WTRs composite magnetic catalyst is prepared by the following method.

The first step: acid leaching of WTRs: WTRs, a byproduct of a water supply plant in Beijing, is naturally dried, crushed, sieved and then used as a raw material. Weighing 10 g of WTRs and evenly dispersing into 150 mL of ultrapure water, adjusting pH of the suspension to 3 by dropwise adding HCl solution, and magnetically stirring for 24 h to fully leach the iron from WTRs into the HCl solution. The iron content of WTRs is 90.52 mg/g, and the iron leaching rate after acid leaching is 95.3%.

The second step: preparation of the precursor by chemical co-precipitation method: adding different doses of cobalt nitrate hexahydrate to the above HCl solution to obtain mixed solutions with different Co/Fe stoichiometric ratios, and adding NaOH solution dropwise to the above mixed solution under vigorous stirring to adjust the pH; placing the above mixed solutions in water baths to perform reactions to obtain solid precipitates, respectively, and the obtained solid precipitates are centrifuged, filtrated, and then dried at 105° C. until reaching a constant weight, respectively.

The third step: preparation of $CoFe_2O_4$-WTRs composite material by calcining the precursor: weighing an appropriate amount of the precursor obtained in the second step, putting the precursor into a ceramic boat, and then putting the ceramic boat into a tube furnace; introducing nitrogen gas (150 mL·min$^{-1}$) to ensure the inert atmosphere; after 30 min, starting the tube furnace, and raising the temperature from room temperature to a target temperature at a heating rate. The obtained $CoFe_2O_4$-WTRs composite magnetic catalyst is taken out after being cooled, then ground, and passed through a 100-mesh sieve to be bottled for use.

Preferably, in the second step, the mass of cobalt nitrate hexahydrate added is 2.24 g, and the Co/Fe stoichiometric ratio is 1/2.

Preferably, in the second step, the NaOH solution is added dropwise under vigorous stirring to make the pH of the mixed solution reach about 11.5.

Preferably, in the second step, the reaction is carried out in a water bath at 65° C. for 30 min.

Preferably, in the third step, the heating rate during the calcination is 10° C. min$^{-1}$, the target temperature is 600° C., and the retention time is 2 h.

Preferably, in the third step, the nitrogen gas is continuously introduced during the calcination to maintain the reducing atmosphere.

In the present invention, with WTRs and cobalt nitrate hexahydrate as raw materials, spinel cobalt ferrite-drinking water treatment residuals composite magnetic catalyst ($CoFe_2O_4$-WTRs) is synthesized by the method of acid leaching, chemical co-precipitation combined with calcination. Wherein, low-cost and non-toxic WTRs has the dual functions of acting as an iron source and a catalyst carrier. The prepared composite magnetic catalyst maintains the spinel structure of the cobalt-iron oxides, possesses a distinct morphological feature and is easy for magnetic separation. Meanwhile, the $CoFe_2O_4$ is well distributed on the composite material, avoiding the decrease of catalytic activity of $CoFe_2O_4$ caused by magnetic aggregation effect.

Another objective of the present invention is to provide a method for degrading atrazine by activating peroxymonosulfate (PMS) with the $CoFe_2O_4$-WTRs composite magnetic catalyst.

A method for degrading atrazine in aqueous solution, using the $CoFe_2O_4$-WTRs and PMS as catalyst and oxidant, respectively, includes the following steps.

The fourth step: degradation of atrazine in ultrapure water: preparing 200 mL of 10 μM atrazine solution using ultrapure water, adding PMS with a set concentration, adding $H_2SO_4$ or NaOH solution to adjust the pH to 3.15-10.15, and adding $CoFe_2O_4$-WTRs with a set dose to the above solution to perform a reaction. Wherein, the concentration of PMS is 0.15-0.30 mM, and the additive amount of $CoFe_2O_4$-WTRs is 0.002-0.008 g. Subsequently, the magnetic stirrer starts to stir the solution. The reaction time is 20 min, the reaction temperature is room temperature, and the reaction atmosphere is air.

The fifth step: degradation of atrazine in actual water: preparing 200 mL of 10 μM atrazine solutions by using the actual water selected from the group consisting of ultrapure water, tap-water, surface water and underground water, adding PMS, adding $H_2SO_4$ to adjust the pH, and adding the $CoFe_2O_4$-WTRs to the above solutions to perform reactions. Subsequently, the magnetic stirrers are started to stir the solutions, respectively. The reaction time is 120 min, the reaction temperature is room temperature, and the reaction atmosphere is air.

Preferably, in the fourth step, 0.25 mM PMS and 0.006 g $CoFe_2O_4$-WTRs are added to 200 mL of 10 μM atrazine solution prepared by using the ultrapure water.

Preferably, in the fourth step, 10-40 mg·L$^{-1}$ chloride ions exist in the atrazine solution.

Preferably, in the fifth step, 0.25 mM PMS is added to the 200 mL 10 μM atrazine solutions prepared using the actual water, the pH values of the solutions are adjusted to 4.01, and then 0.006 g $CoFe_2O_4$-WTRs is added.

The method of degrading atrazine in aqueous solution by activating PMS using the $CoFe_2O_4$-WTRs composite magnetic materials as catalyst according to the present invention, $CoFe_2O_4$-WTRs shows excellent catalytic activity and can degrade atrazine efficiently. The method exhibits superior atrazine degradation efficiency at different concentrations of chloride ions, and the moderate acidic conditions are favorable for the catalytic degradation reaction. In addition, the method can efficiently remove atrazine from the actual water, exhibiting good potential for practical application.

The beneficial effects of the present invention are as follows. The synthesis of $CoFe_2O_4$-WTRs using the method of acid leaching, chemical co-precipitation combined with calcination according to the technical solution of the present invention includes three steps. The first step is acid-leaching of WTRs, WTRs is used as a natural iron source to provide the iron ions for the synthesis of $CoFe_2O_4$; the second step is preparation of a precursor, $CoFe_2O_4$ is synthesized by chemical co-precipitation method and uniformly loaded on WTRs; and the third step is calcining the precursor to synthesize $CoFe_2O_4$-WTRs composite magnetic catalyst. WTRs has the dual functions of acting as iron source and catalyst carrier, which is the process of waste recycling, i.e. not only avoids the supplement of iron-containing reagents and reduces the economic cost of synthesizing $CoFe_2O_4$, but also promotes the uniform distribution of $CoFe_2O_4$ and inhibits the decrease of catalytic activity caused by magnetic aggregation effect.

The catalytic performance of $CoFe_2O_4$-WTRs composite magnetic material is evaluated using PMS as the oxidant and atrazine as the target pollutant. Under the optimized conditions, the atrazine is almost completely degraded; and $CoFe_2O_4$-WTRs still maintains excellent catalytic reactivity in the presence of high concentrations of chloride ions. In addition, $CoFe_2O_4$-WTRs also exhibits good atrazine degradation efficiency in the actual water. By using the present invention, the synthesized magnetic catalyst has the advantages of high catalytic reactivity, low economic cost, and facile preparation process, which is suitable for practical production and has broad application prospects.

DETAILED DESCRIPTION OF THE EMBODIMENTS

The following Embodiments are intended to further illustrate the present invention, but shall not be construed as limitations to the present invention. Modifications and substitutions of the methods, steps or conditions of the present invention without departing from the spirit and essence of the present invention should be considered as falling within the scope of the present invention. The technical means used in the embodiments are conventional means well known to those skilled in the art unless otherwise specified.

Preparation and Characterization of $CoFe_2O_4$-WTRs Composite Magnetic Catalyst The first step: acid leaching of WTRs: WTRs, a by-product from a water supply plant in Beijing, is naturally dried, crushed, sieved and then used as a raw material. 10 g of WTRs is weighed and evenly dispersed in 150 mL of ultrapure water. The pH of the suspension is adjusted to 3 by dropwise adding HCl solution, and magnetically stirring is performed for 24 h to fully leach the iron from WTRs into the HC solution (The iron leaching percentage is 95.3%, that is, the iron content in the leachate is 0.863 g).

The second step: preparation of the precursor by chemical co-precipitation method: 2.24 g of cobalt nitrate hexahydrate is added to the above HCl solution to obtain a mixed solution with a Co/Fe stoichiometric ratio of 1/2, and NaOH solution is added dropwise to the above mixed solution under vigorous stirring until a pH of 11.5 is achieved. Then, the above mixed solution is placed in a water bath to react at 65° C. for 30 min, and the obtained solid precipitate is centrifuged, filtrated, and then dried at 105° C. to reach a constant weight.

Figure 3:
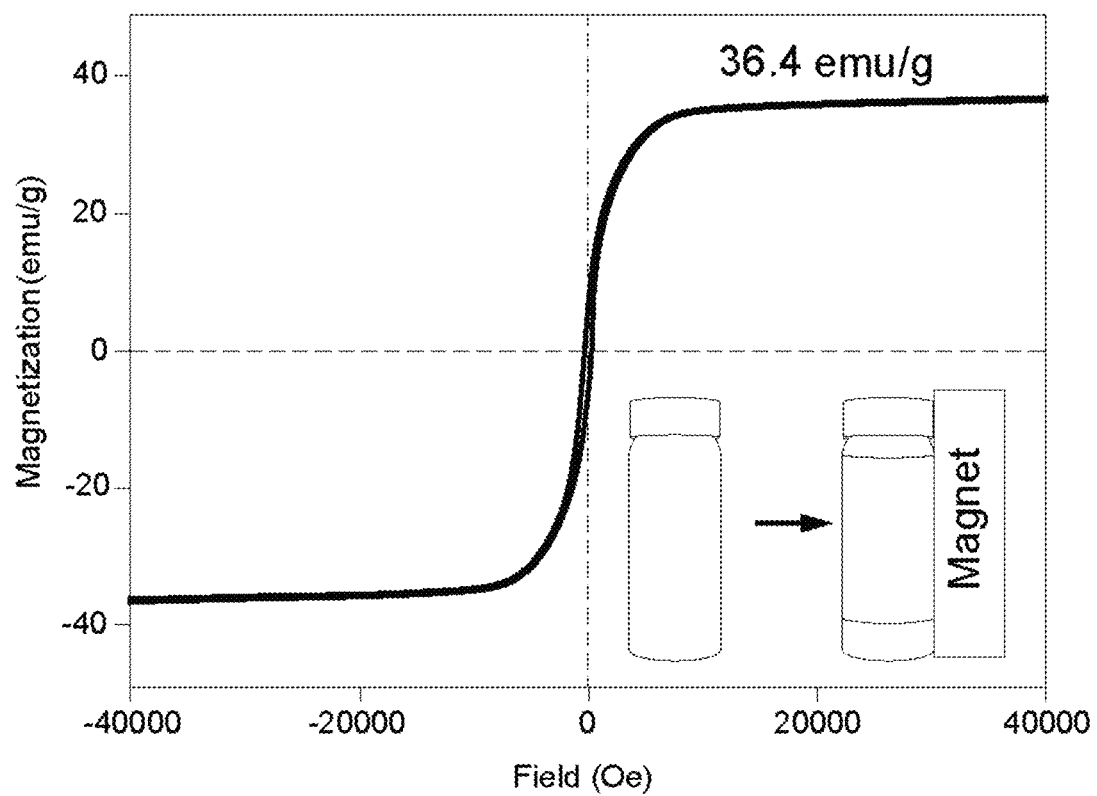
FIG. 3 is a diagram showing a magnetization curve of a $CoFe_2O_4$-WTRs composite magnetic catalyst.

The third step: preparation of $CoFe_2O_4$-WTRs composite material by calcining the precursor: an appropriate amount of the precursor obtained in the second step is weighed, and put into a ceramic boat, then the ceramic boat is put into a tube furnace, nitrogen gas (150 mL·min$^{-1}$) is introduced to ensure the inert atmosphere. After 30 min, the tube furnace is started, and the temperature is raised from room temperature to a target temperature of 600° C. at a heating rate of 10° C. min$^{-1}$. The retention time is 2 h, and a continuous introduction of nitrogen gas is ensured during the calcination process. The $CoFe_2O_4$-WTRs composite magnetic catalyst obtained by calcination is taken out after being cooled, then ground, and passed through a 100-mesh sieve to be bottled for use. The characterization results of the $CoFe_2O_4$-WTRs composite magnetic catalyst are shown in FIGS. 1, 2 and 3.

Figure 1:
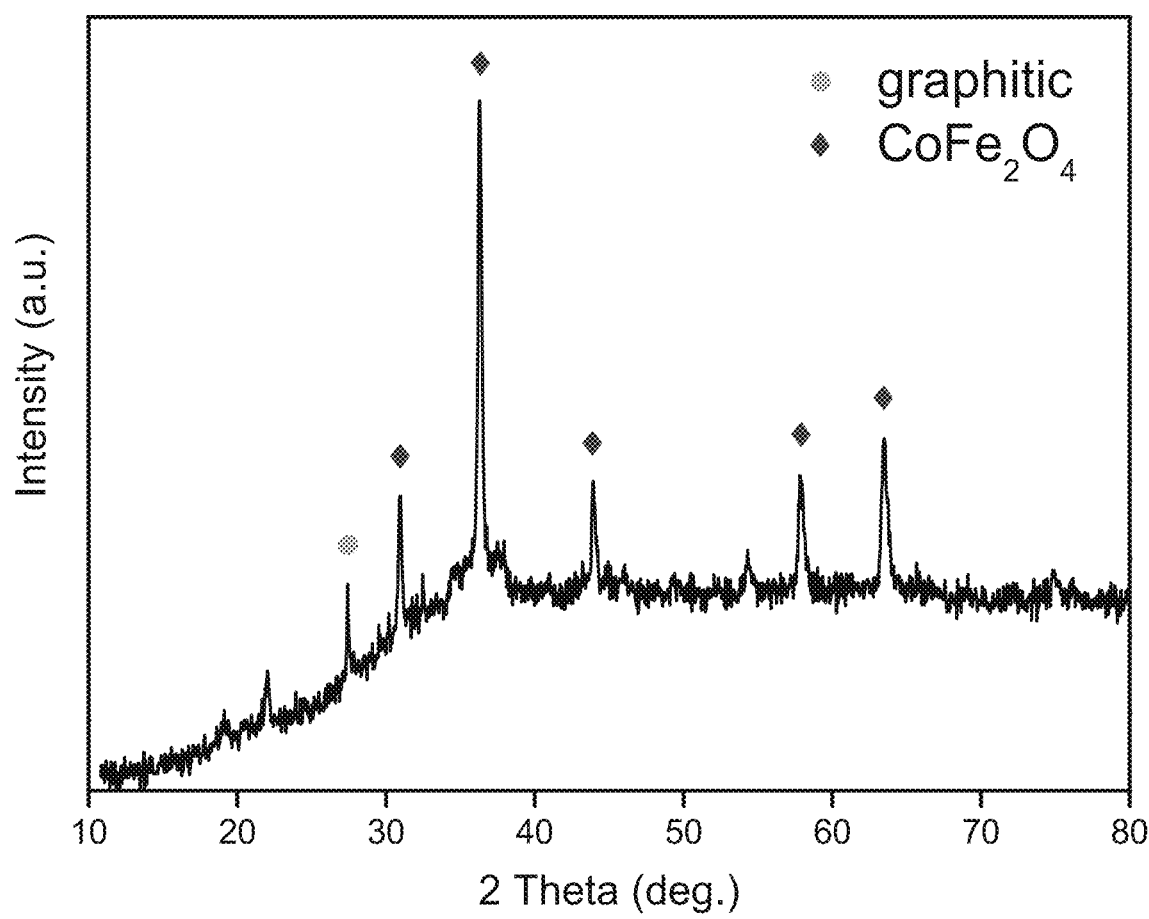
FIG. 1 is an x-ray diffraction (XRD) spectrum of a $CoFe_2O_4$-WTRs composite magnetic catalyst.
Figure 2A:
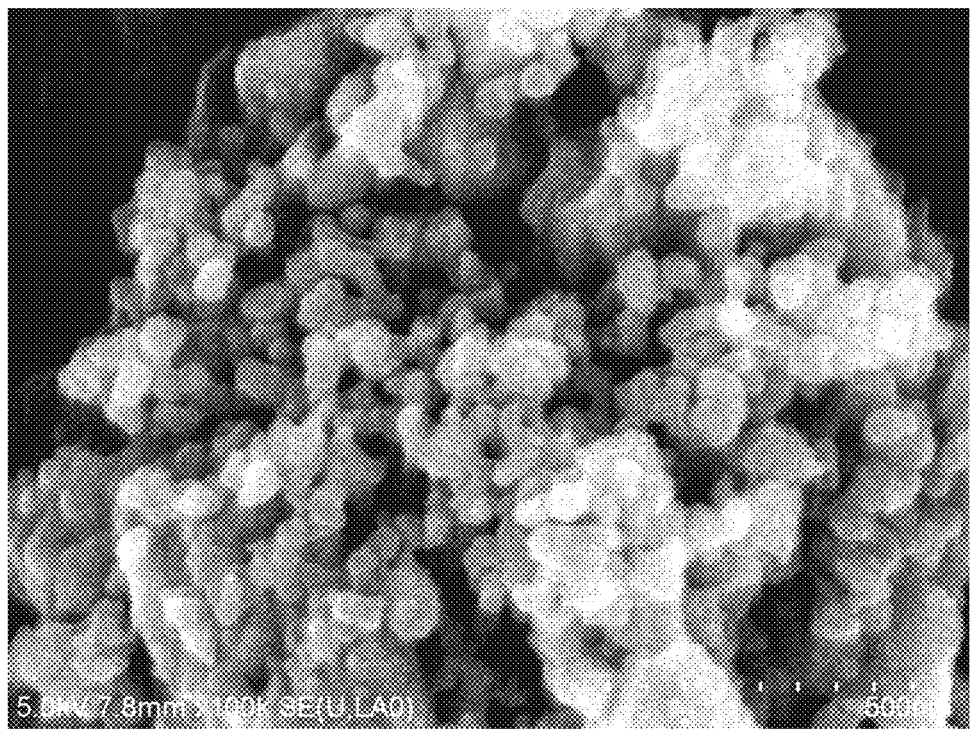
FIG. 2A is a scanning electron microscope spectrum of a $CoFe_2O_4$-WTRs composite magnetic catalyst at magnification of 100 k.
Figure 2B:
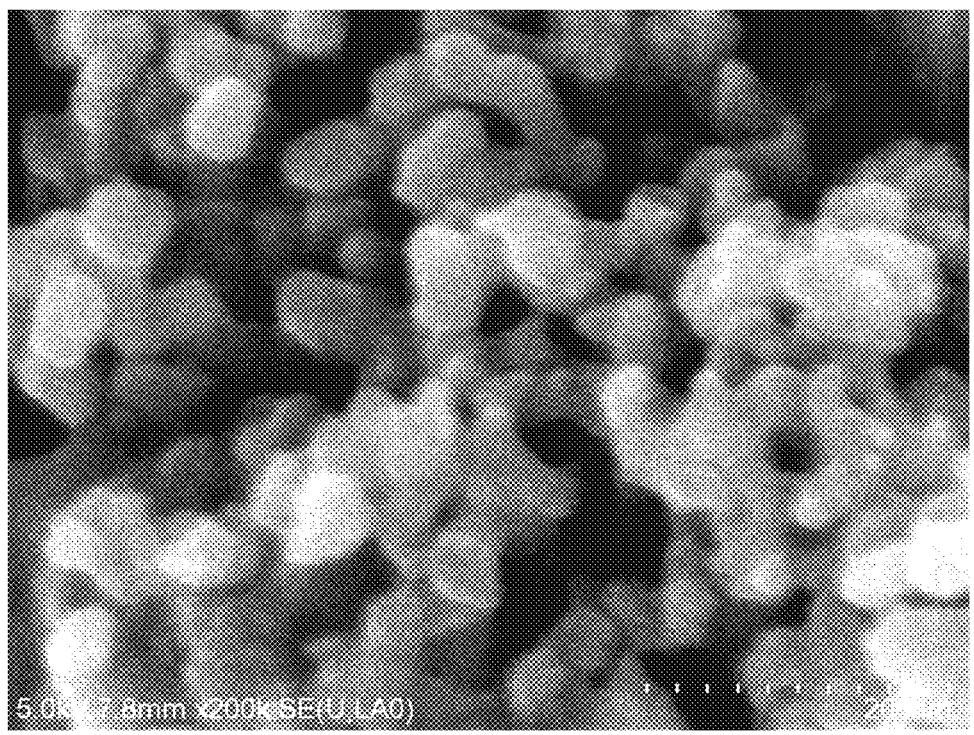
FIG. 2B is a scanning electron microscope spectrum of a $CoFe_2O_4$-WTRs composite magnetic catalyst at magnification of 200 k.
Figure 2C:
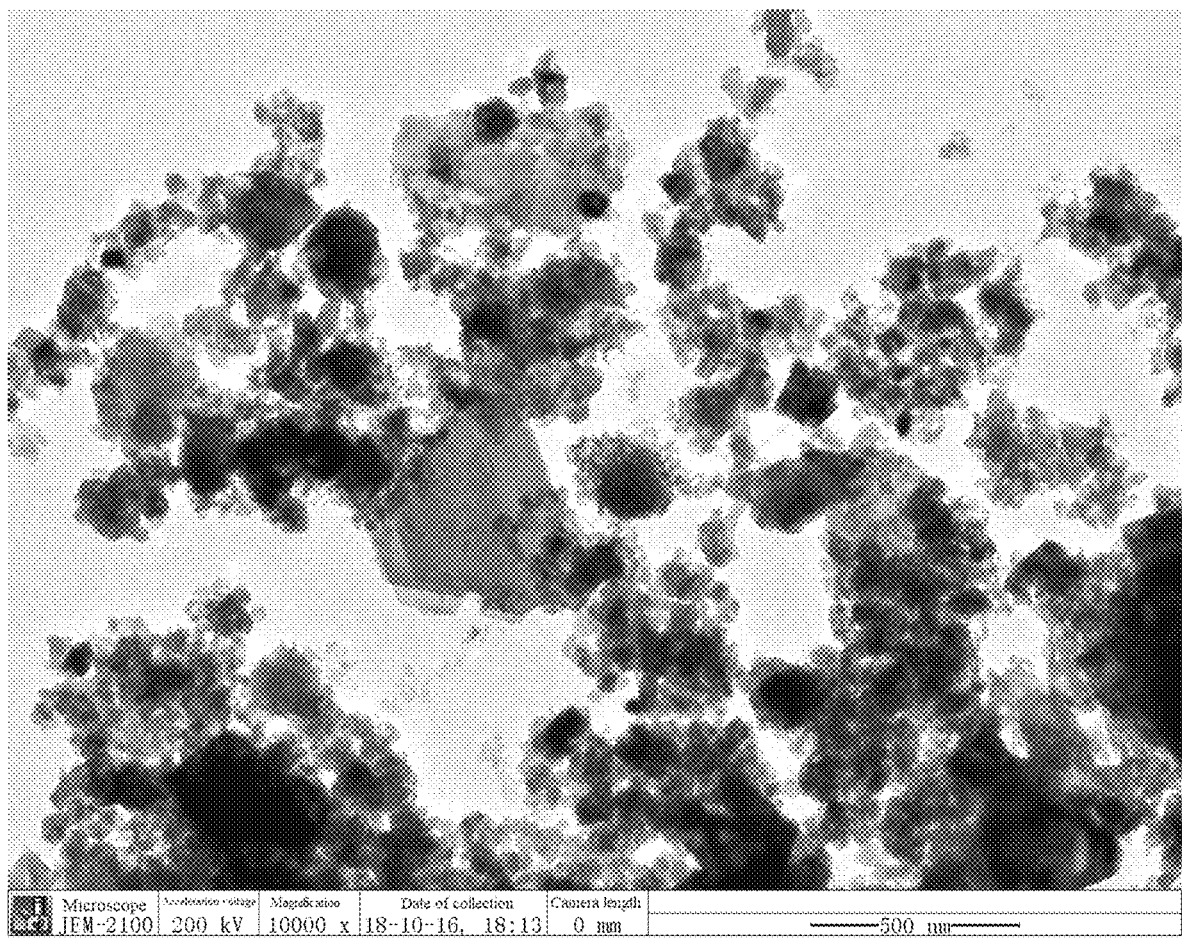
FIG. 2C is a transmission electron microscope spectrum of a $CoFe_2O_4$-WTRs composite magnetic catalyst at magnification of 10000×.
Figure 2D:
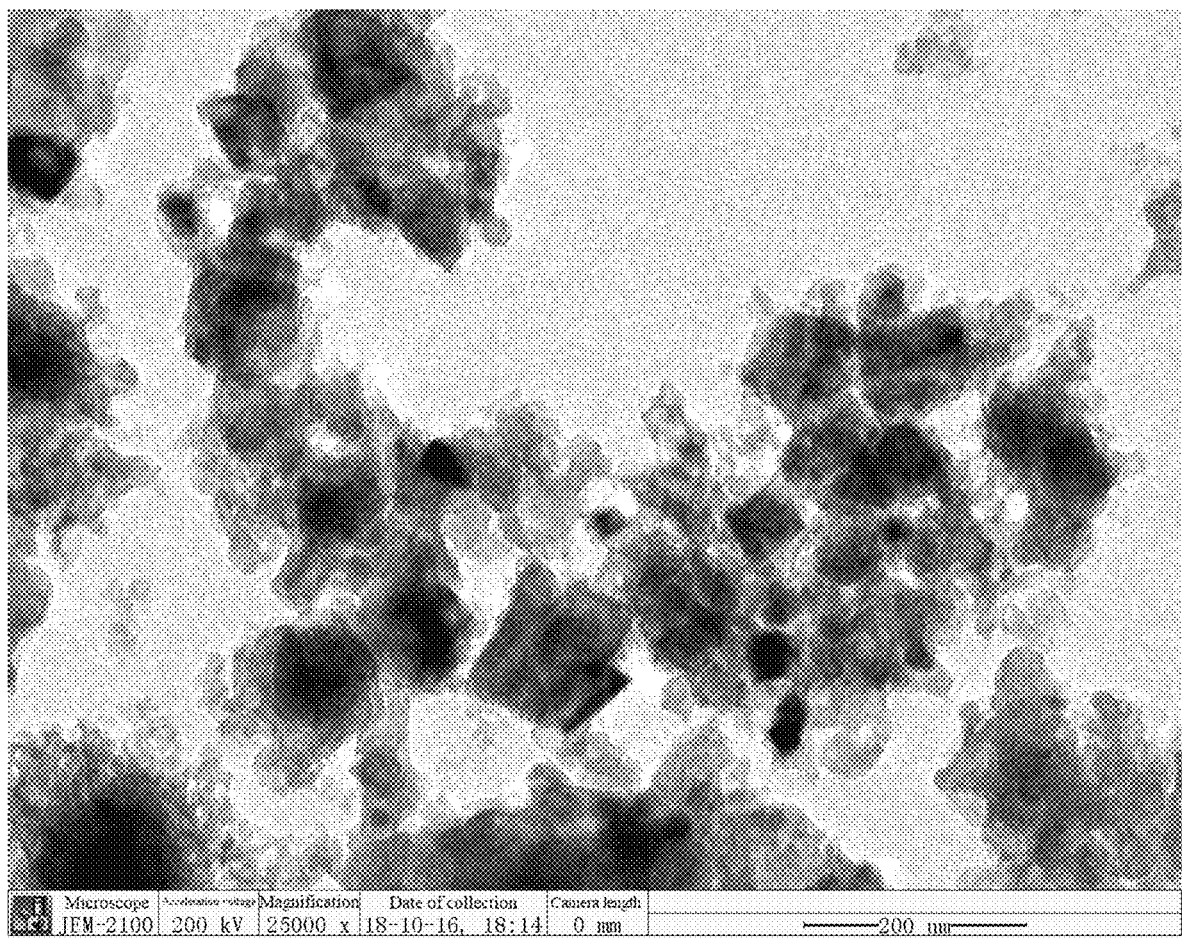
FIG. 2D is a transmission electron microscope spectrum of a $CoFe_2O_4$-WTRs composite magnetic catalyst at magnification of 25000×.

As shown in FIG. 1, the $CoFe_2O_4$-WTRs composite magnetic catalyst synthesized by method of acid leaching, chemical co-precipitation combined with calcination has distinct characteristic peaks of spinel cobalt ferrite, with high peak intensity and sharp peak shape, indicating the synthesized $CoFe_2O_4$ has a high crystallinity. In addition, the characteristic peak of graphite carbon is also observed in the XRD spectrum of $CoFe_2O_4$-WTRs, indicating that the organic matters contained in WTRs are carbonized during the calcination process. FIGS. 2A-2D show that the spinel cobalt ferrite has an irregular cubic structure and well distributed on WTRs without obvious aggregation. FIG. 3 shows that the saturation magnetization of the composite material is 36.4 emu·g$^{-1}$, and the inset shows that the $CoFe_2O_4$-WTRs composite material is easily separated from the aqueous solution by an external magnetic field, exhibiting excellent magnetic separation characteristics.

Degradation of Atrazine by Activating Peroxymonosulfate (PMS) Using the $CoFe_2O_4$-WTRs Composite Magnetic Catalyst Embodiment 1

The first step: acid leaching of WTRs: WTRs, a by-product from a water supply plant in Beijing, is naturally dried, crushed, sieved and then used as a raw material. 10 g of WTRs is weighed and evenly dispersed in 150 mL of ultrapure water. The pH of the suspension is adjusted to 3 by dropwise adding HCl solution, and magnetically stirring is performed for 24 h to fully leach the iron from WTRs into the HCl solution.

The second step: preparation of the precursor by chemical co-precipitation method: 2.24 g of cobalt nitrate hexahydrate is added to the above HCl solution to obtain a mixed solution with a Co/Fe stoichiometric ratio of 1/2, and NaOH solution is added dropwise to the above mixed solution under vigorous stirring until a pH of 11.5 is achieved. Then, the above mixed solution is placed in a water bath to react at 65° C. for 30 min, and the obtained solid precipitate is centrifuged, filtrated, and then dried at 105° C. to reach a constant weight.

The third step: preparation of $CoFe_2O_4$-WTRs composite material by calcining the precursor: an appropriate amount of the precursor obtained in the second step is weighed, and put into a ceramic boat, then the ceramic boat is put into a tube furnace, nitrogen gas (150 mL·min$^{-1}$) is introduced to ensure the inert atmosphere. After 30 min, the tube furnace is started, and the temperature is raised from room temperature to a target temperature of 600° C. at a heating rate of 10° C.·min$^{-1}$. The retention time is 2 h, and a continuous introduction of nitrogen gas is ensured during the calcination process. The $CoFe_2O_4$-WTRs composite magnetic catalyst obtained by calcination is taken out after being cooled, then ground, and passed through a 100-mesh sieve to be bottled for use.

Figure 4:
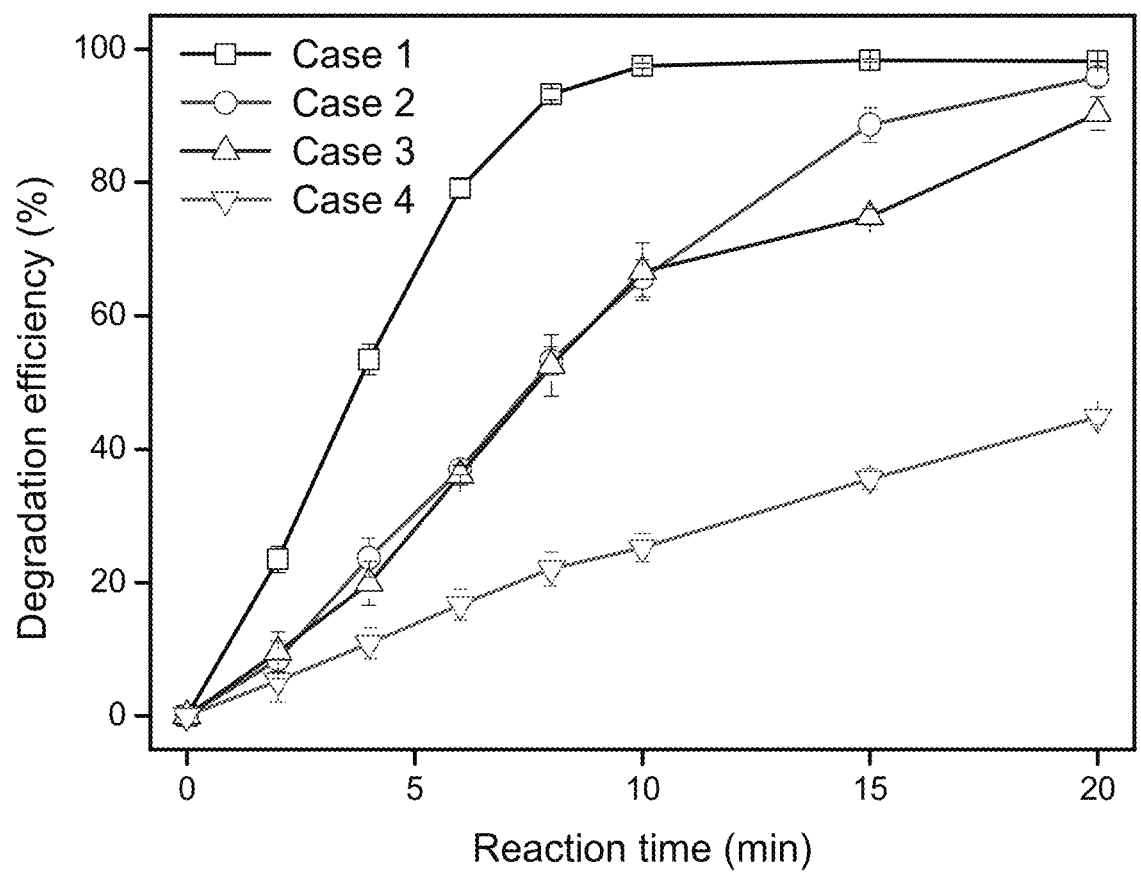
FIG. 4 is a diagram showing degradation curves of atrazine by activating PMS using composite magnetic catalysts with different Co/Fe stoichiometric ratios.

The fourth step: 200 mL of 10 μM atrazine solution is prepared by ultrapure water, and 0.25 mM PMS solution is added into a 250 mL conical flask on a magnetic stirrer, and then the initial pH of the solution is adjusted to 4.01. 0.006 g of the composite magnetic catalyst is quickly added to initiate the degradation reaction. The reaction time is 20 min, the reaction temperature is room temperature, and the reaction atmosphere is air. 1.8 mL of atrazine supernatant is withdrawn at 2 min, 4 min, 6 min, 8 min, 10 min, 15 min and 20 min, respectively, filtrated with 0.22 μm syringe filters, and immediately quenched with 50 μL EtOH. Then, the concentration of atrazine is determined by high performance liquid chromatography to calculate the atrazine degradation efficiency. The experimental results are shown in FIG. 4.

Embodiment 2

Except that in the second step, 1.49 g of cobalt nitrate hexahydrate is added to obtain a mixed solution with the Co/Fe stoichiometric ratio of 0.75/2.25, the other steps are the same as that in Embodiment 1. The experimental results are shown in FIG. 4.

Embodiment 3

Except that in the second step, 0.90 g of cobalt nitrate hexahydrate is added to obtain a mixed solution with the Co/Fe stoichiometric ratio of 0.5/2.5, the other steps are the same as in that Embodiment 1. The experimental results are shown in FIG. 4.

Embodiment 4

Except that in the second step, 0.41 g of cobalt nitrate hexahydrate is added to obtain a mixed solution with the Co/Fe stoichiometric ratio to be 0.25/2.75, the other steps are the same as in that Embodiment 1. The experimental results are shown in FIG. 4.

As shown in FIG. 4, the composite magnetic catalysts with different Co/Fe stoichiometric ratios have the potential to activate PMS to degrade atrazine. The degradation efficiency of atrazine gradually increases with the increase of the Co/Fe stoichiometric ratio, among which $CoFe_2O_4$-WTRs possessed the best catalytic reactivity towards PMS and highest atrazine degradation efficiency.

Embodiment 5

Figure 5:
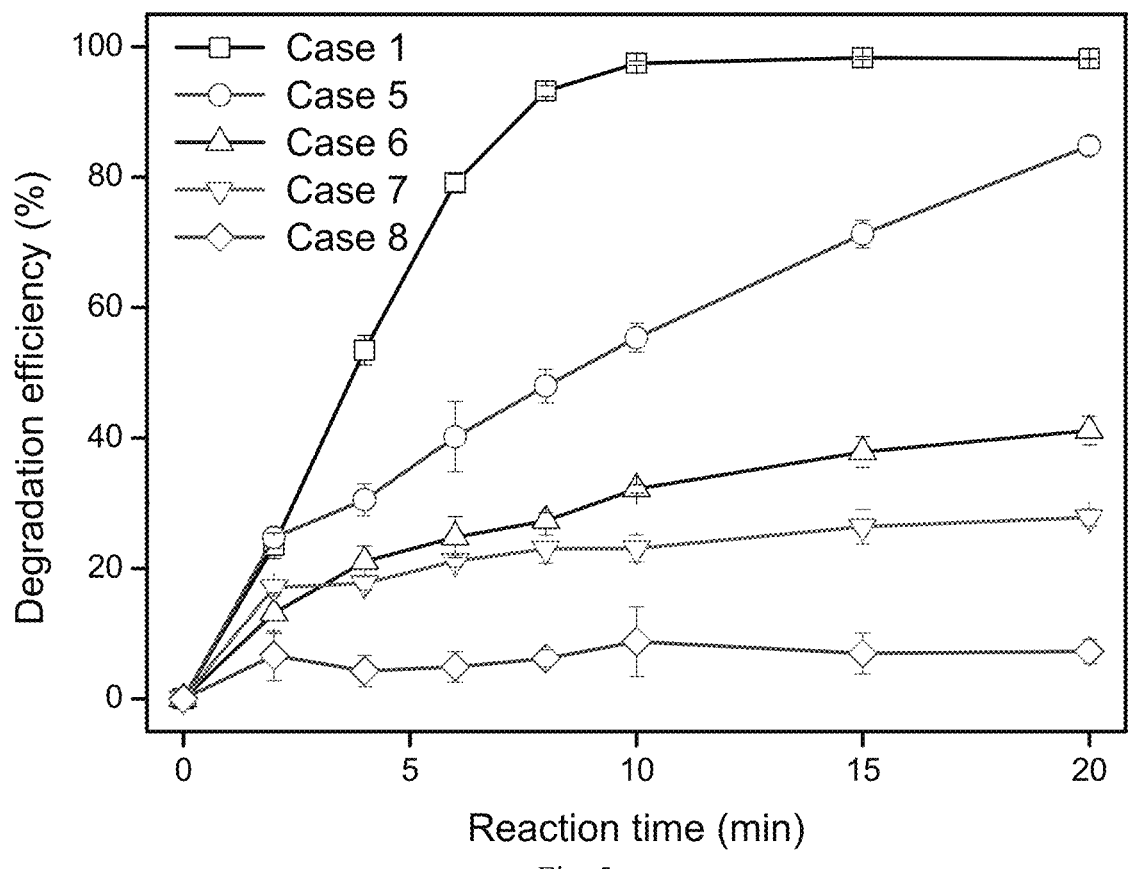
FIG. 5 is a diagram showing degradation curves of atrazine in a $CoFe_2O_4$-WTRs/PMS system under different initial pH values.

Except that in the fourth step, the initial pH of the solution is adjusted to 3.15, the other steps are the same as that in Embodiment 1. The experimental results are shown in FIG. 5.

Embodiment 6

Except that in the fourth step, the initial pH of the solution is adjusted to 4.76, the other steps are the same as that in Embodiment 1. The experimental results are shown in FIG. 5.

Embodiment 7

Except that in the fourth step, the initial pH of the solution is adjusted to 6.85, the other steps are the same as that in Embodiment 1. The experimental results are shown in FIG. 5.

Embodiment 8

Except that in the fourth step, the initial pH of the solution is adjusted to 10.12, the other steps are the same as that in Embodiment 1. The experimental results are shown in FIG. 5.

As shown in FIG. 5, the degradation efficiency of atrazine is significantly affected by the initial solution pH. Highest degradation efficiency is achieved when the initial solution pH is 4.01, with atrazine being almost completely degraded within 20 min. However, superacid, neutral and alkaline conditions are not conducive to the degradation of atrazine.

Embodiment 9

Figure 6:
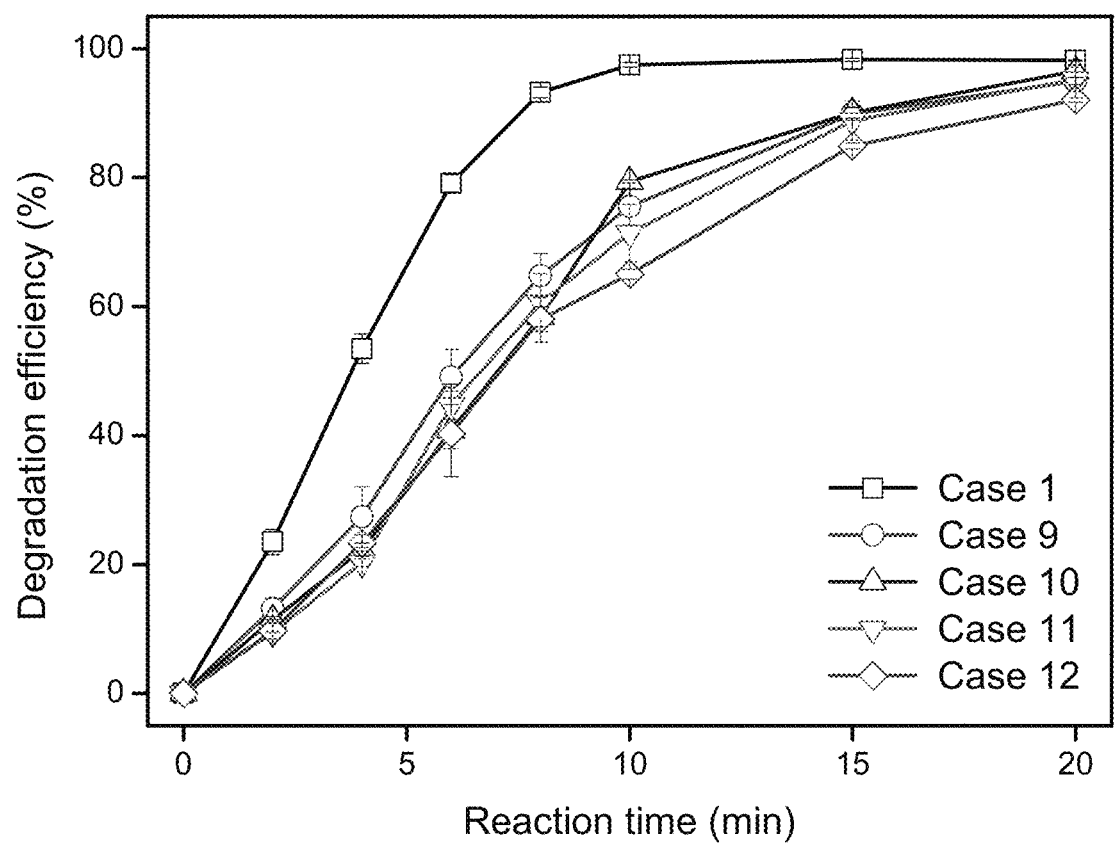
FIG. 6 is a diagram showing degradation curves of atrazine in a $CoFe_2O_4$-WTRs/PMS system under different concentrations of chlorine ions.

Except that in the fourth step, 10 mg·L$^{-1}$ of chloride ions are additionally added to the 250 mL conical flask, the other steps are the same as that in Embodiment 1. The experimental results are shown in FIG. 6.

Embodiment 10

Except that in the fourth step, 20 mg·L$^{-1}$ of chloride ions are additionally introduced to the 250 mL conical flask, the other steps are the same as that in Embodiment 1. The experimental results are shown in FIG. 6.

Embodiment 11

Except that in the fourth step, 30 mg·L$^{-1}$ of chloride ions are additionally introduced to the 250 mL conical flask, the other steps are the same as that in Embodiment 1. The experimental results are shown in FIG. 6.

Embodiment 12

Except that in the fourth step, 40 mg·L$^{-1}$ of chloride ions are additionally introduced to the 250 mL conical flask, the other steps are the same as that in Embodiment 1. The experimental results are shown in FIG. 6.

As shown in FIG. 6, chloride ions inhibited the degradation of atrazine, but the negative effect does not obviously increase with the increase of the concentration of the chloride ions, indicating that the CoFe$_2$O$_4$-WTRs/PMS system can maintain good catalytic performance even in the presence of high concentration of chloride ions.

Embodiment 13

The first step: acid leaching of WTRs: WTRs, a byproduct from a water supply plant in Beijing, is naturally dried, crushed, sieved and then used as a raw material. 10 g of WTRs is weighed and evenly dispersed in 150 mL of ultrapure water. The pH of the suspension is adjusted to 3 by dropwise adding HCl solution, and magnetically stirring is performed for 24 h to fully leach the iron from WTRs into the HC solution.

The second step: preparation of the precursor by chemical co-precipitation method: 2.24 g of cobalt nitrate hexahydrate is added to the above HCl solution to obtain a mixed solution with a Co/Fe stoichiometric ratio of 1/2, and NaOH solution is added dropwise to the above mixed solution under vigorous stirring until a pH of 11.5 is achieved. Then, the above mixed solution is placed in a water bath to react at 65° C. for 30 min, and the obtained solid precipitate is centrifuged, filtrated, and then dried at 105° C. to reach a constant weight.

The third step: preparation of CoFe$_2$O$_4$-WTRs composite material by calcining the precursor: an appropriate amount of the precursor obtained in the second step is weighed, and put into a ceramic boat, then the ceramic boat is put into a tube furnace, nitrogen gas (150 mL min$^{-1}$) is introduced to ensure the inert atmosphere. After 30 min, the tube furnace is started, and the temperature is raised from room temperature to a target temperature of 600° C. at a heating rate of 10° C.·min$^{-1}$. The retention time is 2 h, and a continuous introduction of nitrogen gas is ensured during the calcination process. The CoFe$_2$O$_4$-WTRs composite magnetic catalyst obtained by calcination is taken out after being cooled, then ground, and passed through a 100-mesh sieve to be bottled for use.

Figure 7:
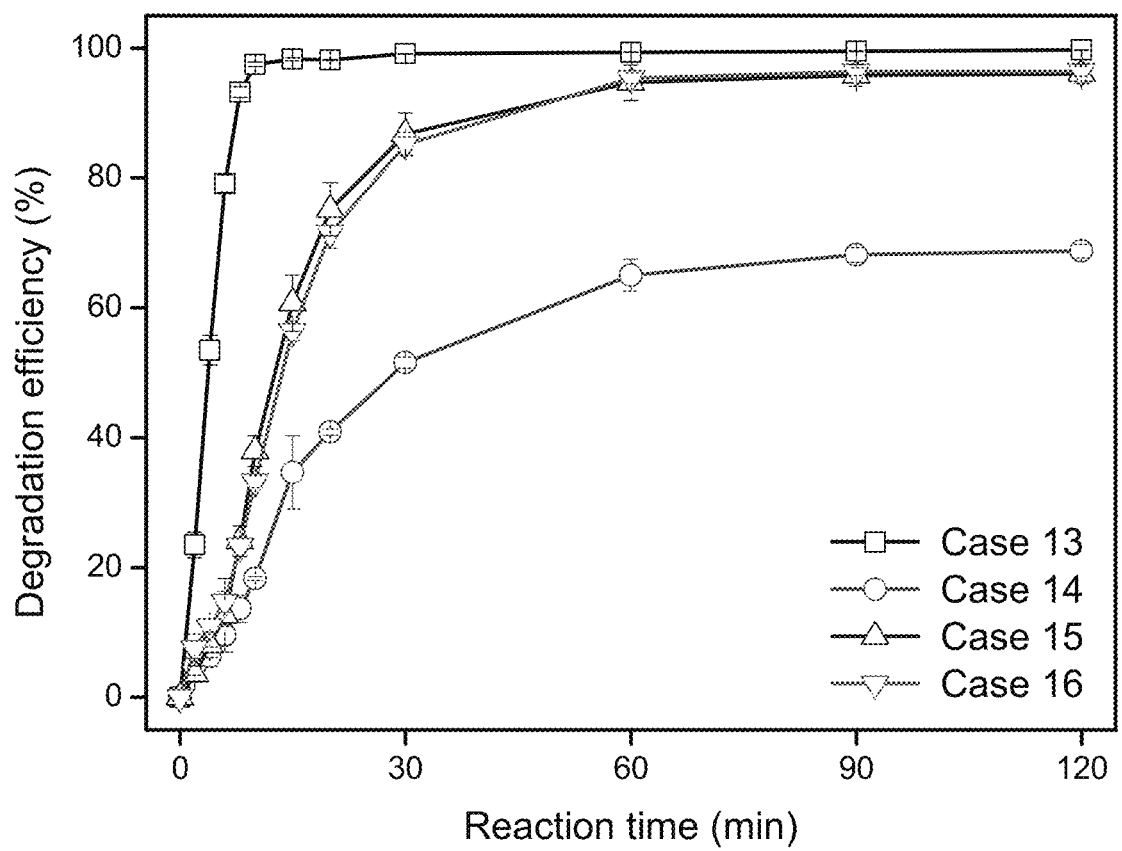
FIG. 7 is a diagram showing degradation efficiency of atrazine in real water in a $CoFe_2O_4$-WTRs/PMS system.

The fourth step: 11 0.006 g of the composite magnetic catalyst is quickly added to initiate the degradation reaction. The reaction time is 20 min, the reaction temperature is room temperature, and the reaction atmosphere is air. 1.8 mL of atrazine supernatant is withdrawn at 2 min, 4 min, 6 min, 8 min, 10 min, 15 min and 20 min, respectively, filtrated with 0.22 μm syringe filters, and immediately quenched with 50 μL EtOH. Then, the concentration of atrazine is determined by high performance liquid chromatography to calculate the atrazine degradation efficiency. The experimental results are shown in FIG. 7.

Embodiment 14

Except that in the fourth step, 200 mL of 10 μM atrazine solution prepared by tap-water is added into a 250 mL conical flask, the other steps are the same as that in Embodiment 13. The experimental results are shown in FIG. 7.

Embodiment 15

Except that in the fourth step, 200 mL of 10 μM atrazine solution prepared by surface water is added into a 250 mL conical flask, the other steps are the same as that in Embodiment 13. The experimental results are shown in FIG. 7.

Embodiment 16

Except that in the fourth step, 200 mL of 10 μM atrazine solution prepared by underground water is added into a 250 mL conical flask, the other steps are the same as that in Embodiment 13. The experimental results are shown in FIG. 7.

As shown in FIG. 7, except that the degradation efficiency of atrazine in the tap-water is 68.7%, the atrazine in ultrapure water, surface water and underground water can be almost completely degraded, indicating that the CoFe$_2$O$_4$-WTRs/PMS system has good practical application potential.

What is claimed is:
1. A method for preparing a CoFe$_2$O$_4$-WTRs composite magnetic catalyst, comprising the following steps:
   the first step of acid leaching WTRs (drinking water treatment residuals): drying, crushing and sieving WTRs which is a byproduct of a water supply plant to obtain a WTRS raw material; weighing 10 g of the WTRs raw material and evenly dispersing the WTRs in

150 mL of ultrapure water to form a suspension; adjusting a pH of the suspension to 3 by dropwise adding a HCl solution, and magnetically stirring for 24 h to fully leach irons from the suspension into the HCl solution to obtain a first solution; wherein an iron content of the WTRs after acid leaching is 90.52 mg/g, and an iron leached percentage by weight after acid leaching is 95.3%;

the second step of preparing a precursor by chemical co-precipitation method: adding a predetermined dose of cobalt nitrate hexahydrate to the first solution to obtain a mixed solution with a predetermined Co/Fe stoichiometric ratio, and adding NaOH solution dropwise to the mixed solution under vigorous stirring to adjust a pH of the mixed solution to 11.5; then, placing the mixed solution with the pH of 11.5 in a water bath to perform a reaction to obtain a solid precipitate, and centrifuging the solid precipitate, then filtrating, and drying at 105° C. to reach a constant weight to obtain the precursor; and the third step of preparing a $CoFe_2O_4$-WTRs composite magnetic catalyst by calcining the precursor: weighing a predetermined amount of the precursor obtained in the second step, and putting the precursor into a ceramic boat, then putting the ceramic boat into a tube furnace, introducing nitrogen gas at a rate of 150 mL·min$^{-1}$ to ensure an inert atmosphere; after 30 min, using the tube furnace to perform a calcination; during the calcination, a temperature is raised from room temperature to a target temperature at a heating rate; and cooling the $CoFe_2O_4$-WTRs composite magnetic catalyst obtained by the calcination, then taking out, grinding and passing the $CoFe_2O_4$-WTRs composite magnetic catalyst through a 100-mesh sieve, and bottling for use.

2. The method according to claim 1, wherein in the second step, the predetermined dose of the cobalt nitrate hexahydrate added is 2.24 g, and the predetermined Co/Fe stoichiometric ratio is 1/2.

3. The method according to claim 1, wherein in the second step, the reaction is carried out in a water bath at 65° C. for 30 min.

4. The method according to claim 1, wherein during the calcination of the third step, the heating rate is 10° C.·min$^{-1}$, the target temperature is 600° C., a retention time is 2 h, and the nitrogen gas is continuously introduced during the calcination to maintain g reducing atmosphere.

5. A method for degrading atrazine in ultrapure water by activating peroxymonosulfate (PMS) using the $CoFe_2O_4$-WTRs composite magnetic catalyst according to claim 1, comprising the following step: using ultrapure water to prepare 200 mL of 10 μM atrazine solution, adding a solution of PMS (peroxymonosulfate) with a set concentration, and adding a $H_2SO_4$ solution or a NaOH solution to adjust a pH to 3.15-10.15 to obtain a second solution; then, adding the $CoFe_2O_4$-WTRs composite magnetic catalyst with a set dose to the second solution; wherein, a concentration of the solution of the PMS is 0.15-0.30 mM, and an additive amount of the $CoFe_2O_4$-WTRs composite magnetic catalyst is 0.002-0.008 g; subsequently, stirring the second solution using a magnetic stirrer, and during the stirring, a reaction time is 20 min, a reaction temperature is room temperature, and a reaction atmosphere is air.

6. A method for degrading atrazine in actual water by activating peroxymonosulfate (PMS) using the $CoFe_2O_4$-WTRs composite magnetic catalyst according to claim 1, comprising the following step:

preparing 200 mL of 10 μM atrazine solution by using actual water, wherein the actual water is selected from the group consisting of ultrapure water, tap-water, surface water and underground water; adding a solution of PMS with a set concentration to the 200 mL of 10 μM atrazine solution to obtain a second solution, and adding $H_2SO_4$ to adjust a pH value of the second atrazine solution to 4.01: then, adding the $CoFe_2O_4$-WTRs composite magnetic catalyst to the second atrazine solution with the pH value of 4.01 to obtain a third solution; subsequently, stirring the third solution using magnetic stirrers, and during the stirring, a reaction time is 120 min, a reaction temperature is room temperature, and a reaction atmosphere is air.

7. The method according to claim 5, wherein a 0.25 mM solution of the PMS and 0.006 g of the $CoFe_2O_4$-WTRs composite magnetic catalyst are added to the 200 mL of 10 μM atrazine solution prepared by using the ultrapure water.

8. The method according to claim 5, wherein 10-40 mg·L$^{-1}$ chloride ions exist in the 200 mL of 10 μM atrazine solution.

9. The method according to claim 6, wherein a 0.25 mM solution of the PMS is added to the 200 mL 10 μM atrazine solutions prepared using the actual water, and then 0.006 g of the $CoFe_2O_4$-WTRs composite magnetic catalyst is added.

\* \* \* \* \*